UNITED STATES PATENT OFFICE.

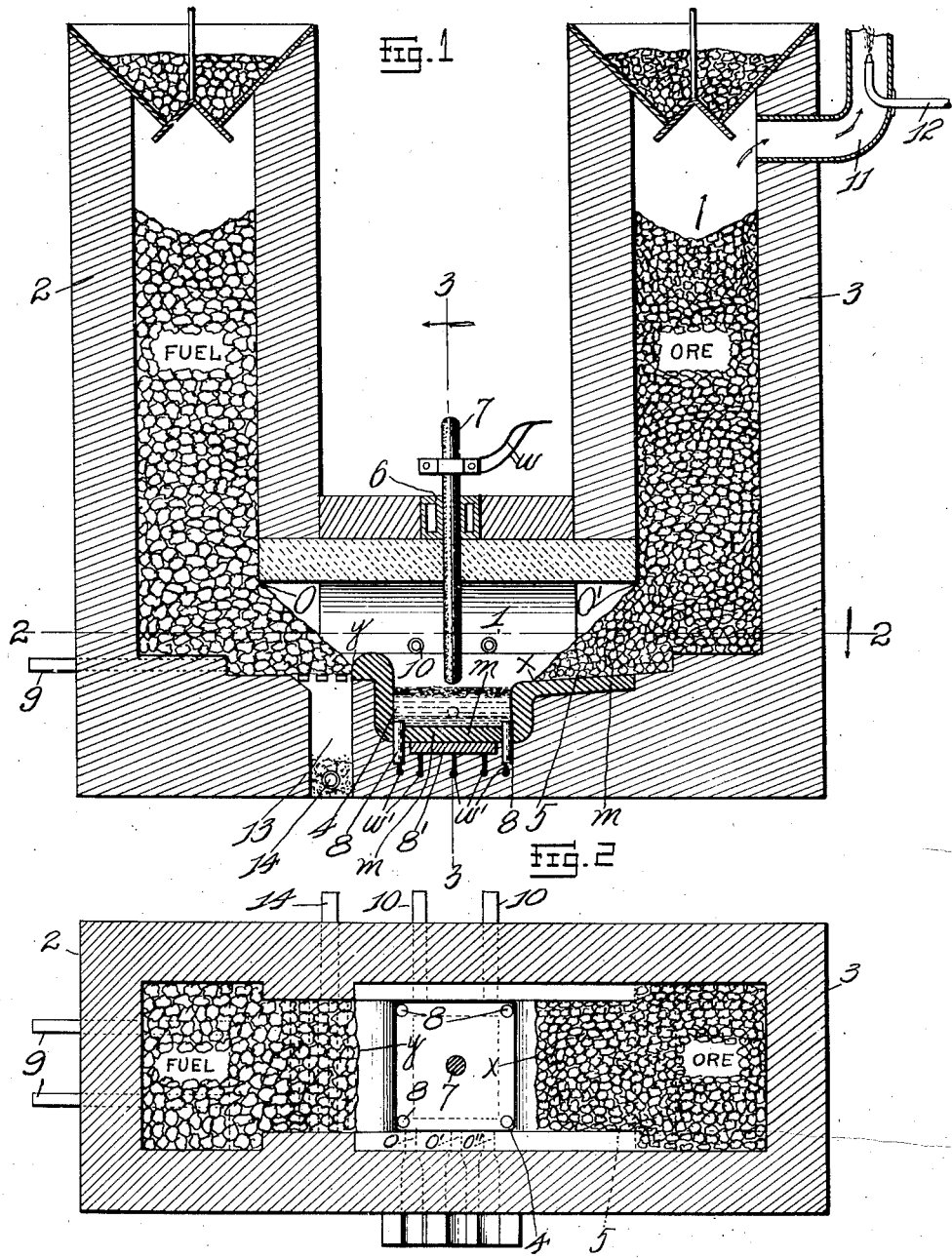

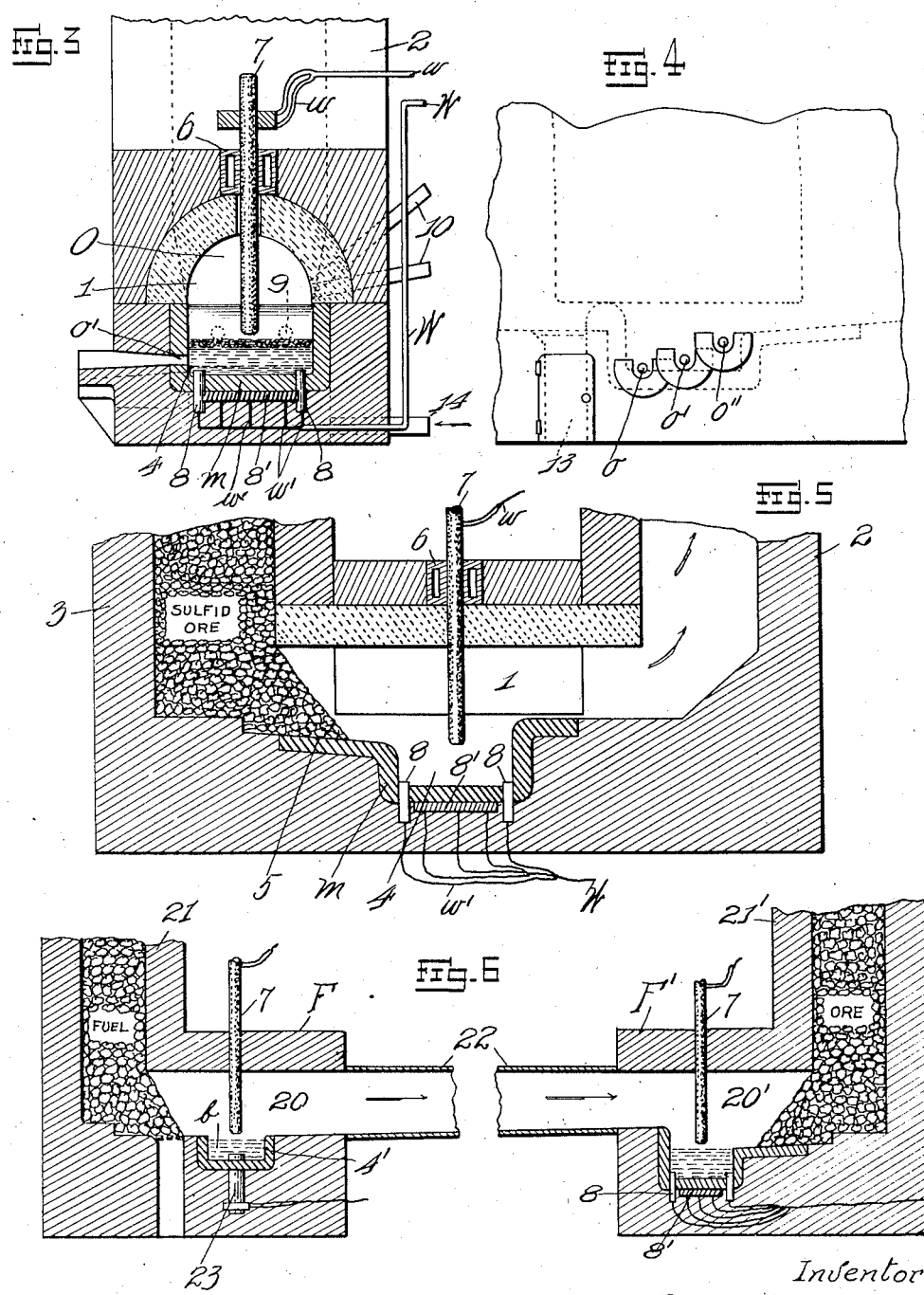

JAMES C. DOW, OF GREAT FALLS, MONTANA.

PROCESS OF ELECTRIC SMELTING AND FURNACE FOR SAME.

Application filed July 6, 1920. Serial No. 394,236.

*To all whom it may concern:*

Be it known that I, JAMES C. Dow, a citizen of the United States, residing at Great Falls, in the county of Cascade and State of Montana, have invented certain new and useful Improvements in Processes of Electric Smelting and Furnaces for Same, of which the following is a full, clear, and exact description, reference being had to the accompanying drawings, forming a part hereof.

The present invention is directed to improvements in processes of electric smelting and furnaces for carrying on the same, the primary objects sought by the invention being to effect the smelting and reduction of ores in the smelting zone or hearth of the furnace without previously mixing the ore with the fuel by which the reducing reagents are supplied. In other words, the ore, fuel, and source of electric heat are kept entirely separated, being however so interrelated as to bring about the desired conditions under which not only will reduction of the ore body be effected, but the resulting metal and slag be smelted, the heat required by the process being contributed by the electric arc, the combustion of the fuel, and the chemical reactions between the various elements that may be involved. In order to reduce the amount of electrical energy to a minimum, an excess of fuel (or reducing agent) is preferably employed, the heat from the latter supplementing that generated by the former, the electric heat being employed more for the purpose of regulating the temperature of the bath and other portions of the furnace as required, once the proper working temperature in the smelting zone has been attained. By "fuel" is meant not necessarily carbonaceous material (coal, coke, and the like) but any equivalent thereof such as sulfur, the oxidation of the latter being availed of for example in treating sulfid ores, for the production of matte, the burning sulfur of the ore generating sufficient heat to smelt the ore once the sulfur has been thoroughly ignited. Again, in lieu of "fuel" we may substitute any substance which under proper conditions may evolve or generate carbon monoxid (CO) or other reducing reagent which is free to operate as a reducer for the ore. Under my process the reducing gas need not necessarily be generated by the heat of the arc in the smelting zone, but may be generated in an independent chamber, in which event such chamber and the smelting zone to which the ore is delivered would be intercommunicating as will hereinafter more fully appear. In all cases however, the basic idea involved is the production of a reducing reagent or gas from a fuel or other suitable material initially raised to the proper temperature by the heat of an electric arc (or resistor) and the reduction of the ore by this reagent in the same or an adjacent inter-communicating furnace, the ore treated carrying no fuel or reducing material other than what might in some cases be introduced to supplement the heat of the arc to effect the smelting of the ore charge. The furnaces or instrumentalities for carrying on the process will necessarily present some features of construction not present in electric furnaces as ordinarily built for treating charges of ore mixed with fuel, as will more fully appear from the following detailed description of the invention in connection with the accompanying drawings in which—

Figure 1 represents a midde vertical section through the smelting zone and shafts of the furnace designed to carry on my process; Fig. 2 is a horizontal section on the line 2—2 of Fig. 1; Fig. 3 is a vertical transverse section through the smelting zone on the line 3—3 of Fig. 1; Fig. 4 is a side elevation of a portion of the furnace showing end views of the gutters leading from the tap holes; Fig. 5 is a vertical section similar to Fig. 1 showing the application of the furnace to the treatment of sulfid ores; and Fig. 6 is a section similar to Fig. 5 showing a modification in which the reducing gases are generated in a separate and independent chamber in communication with the smelting zone for the ore.

Referring to the drawings, and for the present to Figs. 1 to 4 inclusive, 1 represents the smelting zone or chamber of a suitable electric furnace, the same being bounded on one side by a fuel shaft 2 and on the opposite side by an ore shaft 3, the bottoms or discharge ends of the shafts communicating with said chamber through openings 0, 0', respectively as shown. The hearth or collecting basin 4 of the smelting zone is lined with refractory material *m*, the arched roof of the chamber being likewise constructed of refractory material as well understood in the art. In the present invention the shafts 2 and 3 are sufficiently removed from the collecting basin 4 to prevent the charges of fuel and ore from sliding directly into the basin, the angles of repose of the respective materials discharged from the shafts being such as to bring the fuel and ore lines wholly outside the basin, the ore line terminating at the point $x$ on the shelf 5 leading to the basin, and the fuel line terminating at a slightly higher level at the point $y$ (Fig. 2). This arrangement, as presently to be seen, prevents the fuel and ore from coming in contact with the electrodes, but permits the molten metal from the ore shaft to accumulate in the basin and thereby form one of the electrodes for the smelting zone as will hereinafter more fully appear. Projecting centrally into the smelting zone through the roof thereof and traversing a heat insulated, air or water cooled seal or stuffing box 6, is the upper electrode 7, the same being connected by the conductors or wires $w$ to one of the terminals of the secondary of any suitable transformer (not shown) as well understood in the art. In the present embodiment of the invention the bottom electrode comprises a plurality of cast-iron pins 8 projecting through the bottom of the collecting basin, and a plate 8′ disposed along the bottom surface of the basin lining, the several members being connected to suitable conductors $w'$ radiating from a common conductor W leading to the opposite terminal of the secondary of the transformer aforesaid. Leading to the bottom of the fuel shaft 2 are air inlets or ducts 9 for admitting air to assist in the combustion of the fuel. Ducts 10 leading from the smelting zone are merely for observation and will ordinarily remain closed. The ore shaft is provided with an exit flue 11 leading either to a chimney or exhauster (not shown) or the same may be provided with a jet exhauster 12, for inducing a circulation of the reducing gases across the smelting zone into the ore mass, and for drawing out the cooled dead gases resulting from the reactions between the reducing gases from the fuel and the oxidized and other mineral particles of the ore with which the shaft 3 is charged. Tap holes $o$, $o'$, $o''$, are placed at proper levels to drain the basin 4 of the starting bath, the molten metal from the reduced ore, and the slag respectively, as well understood in the art.

The operation of the furnace is substantially as follows: To start the furnace, the shafts 2 and 3 are first respectively charged with carbonaceous fuel and the ore to be reduced and smelted, a proper complement of fluxing material being of course mixed with the ore. The hearth is filled with scrap iron covering the pins 8, and when the current is turned on this scrap will melt, forming a starting bath in electrical connection with the pins (and with the plate 8′ through the conducting lining $m$) and in arcing proximity to the inner end of the upper electrode 7. The result is a direct-heating arc furnace, the starting bath receiving accessions of molten metal flowing from the shaft 3 as fast as the ore therein is reduced and smelted. The heat of the arc in conjunction with the proper complement of air admitted to the bottom of the fuel shaft 2 through the passages 9, generates from the fuel the proper reducing gases (CO accompanied by inert nitrogen) which are drawn from the bottom of the fuel shaft across the smelting zone or chamber 1 and into and through the charge of ore in the shaft 3, the flow of the gases in the manner indicated resulting from the action of the exhauster 12 or its equivalent. The reducing gases in their passage through the chamber 1 become highly heated, and as they are drawn through the charge of ore they act effectively on the metallic oxides and other mineral constituents and reduce the same to metallic form, the high temperature at the base of the ore column or where the hot gases first enter the ore body, causing a fusion of the reduced metal and slag-forming materials, the fused product flowing down the inclined shelf 5 into the basin 4. As the same accumulates in the basin, the molten metal and slag floating thereon are trapped from time to time, a sufficient quantity of metal for starting purposes being permanently left below the tap hole $o'$ except in cases where the hearth requires extensive repairs or reconstruction, or the installation of new pins 8, in which event this starting bath is drained through the bottom tap hole $o$. The spent gases and nitrogen escape through the exit flue 11 to a chimney or directly into the atmosphere if desired. The ashes from the burnt fuel drop into the ash-pit 13 as shown, whence they are removed from time to time. In the present example a duct 14 leads to the ash-pit for admitting air under the fuel if desired. It will be seen from the foregoing that the smelting operation is conducted by keeping the fuel and ore entirely separate, the reduction being effected by the hot gases evolved from the fuel acting upon the charge of ore in the shaft 3, the gases being drawn across the chamber of the smelting zone 1 in which they are highly heated preparatory to reacting upon the ore mass in the shaft 3. Once the proper working conditions and temperature have been attained, the heat of reaction and burning fuel is primarily depended on, the electric arc being used to regulate the temperature of the bath and other portions of the furnace if desired. Obviously, an excess of fuel must be employed to furnish the bulk of the heat if the arc is to be used for the mere purpose of regulating the temperature as indicated. It was pointed out above that carbon is not the only fuel that may be employed in metallurgical operations. In smelting sulfid ores for matte for example, the sulfur component of the ore is depended on to furnish the heat of oxidation. In Fig. 5 I show an electric furnace identical with that above described, in which the shaft 3 is charged with sulfid ore, the shaft 2 being used as an uptake for the spent gases ($SO_2$) evolved from a burning charge of sulfids. The materials accumulating on the hearth or basin 4 are matte and slag which may be tapped from time to time as well understood in the art.

Again, the reducing gases need not necessarily be generated by the heat of the arc in the smelting zone, it being possible to produce the gases in an independent but intercommunicating chamber. Such a modification is shown in Fig. 6 where two separate furnaces are employed, each with a single shaft. The furnace F is provided with a heating chamber 20 communicating with a fuel shaft 21, and the furnace F' is provided with a smelting zone or chamber 20' communicating with an ore shaft 21', the chambers 20, 20', being connected by a conduit or flue 22 for the passage of the gases (CO and N) from the chamber 20 to the chamber 20', the CO reacting with the oxidized minerals of the ore forming $CO_2$ which with the nitrogen escapes from the top of the shaft as in the first form described. The electrodes leading to the chamber 20' are the same as those previously described; the electrodes for the chamber 20 on the other hand are slightly varied the bottom electrode being in the form of an iron bar 23 in lieu of the pins 8 and plate 8' shown in the other forms. In the basin 4' of the chamber 20 a permanent bath of metal $b$ is retained for arcing with the top electrode 7, the latter being the same as the corresponding electrode in the other figures. Obviously, many changes may be resorted to without in any wise departing from the nature or spirit of the invention. The invention is not to be restricted to the reduction and smelting of "ores", but may be employed in treating metallic oxids and compounds generally.

It is to be understood that other types of furnace from that here shown may be availed of to carry on my improved process. For example, it is not necessary to employ the bath as a return conductor. We may substitute the independent arc furnace, or furnaces having two or more electrodes; or we may employ a furnace with a suitable resistor (other than the arc) as the source of heat and eliminate the arc altogether. This will be obvious to those skilled in the art.

Having described my invention what I claim is:

1. In the smelting of ores, the process which consists in subjecting independent charges of ore and fuel in non-contacting relation to heat at a sufficient temperature to generate reducing gases from the fuel, causing the hot reducing gases to react upon the ore charge to effect a reduction of the metal constituents thereof, causing a fusion of the ore mass after reduction, and finally removing the molten products.

2. In the smelting of ores, the process which consists in subjecting independent charges of ore and fuel separated sufficiently to prevent intermingling with one another to heat at a sufficient temperature to generate reducing gases from the fuel, causing the hot reducing gases to react upon the ore charge to effect a reduction of the metal constituents thereof, and maintaining the temperature of the ore mass at the points first engaged by the gases sufficiently high to fuse the reduced metal and associated slag forming materials, and finally removing the reduced molten metal.

3. In the smelting of ores, the process which consists in generating suitable reducing gases from a charge of fuel, causing said gases while hot to traverse an independent ore mass to effect reduction of the metal constituents of the ore, the charges of ore and fuel being separated sufficiently to prevent commingling, maintaining the temperature of the ore mass in the region first entered by the gases sufficiently high to fuse the reduced metal, collecting the reduced molten metal in a bath out of contact with the fuel and ore mass, and finally removing said metal from the bath.

4. In the smelting of ores, the process which consists in subjecting non-contacting charges of ore and fuel to the heat of an electric arc at a sufficient initial temperature to generate reducing gases from the fuel, causing the hot reducing gases to traverse and react upon the ore mass, maintaining the temperature of the ore body in the region first entered by the gases sufficiently high to fuse the reduced metal, collecting the reduced molten metal in a bath out of contact with the fuel and ore body, and finally removing the metal from the bath.

5. In the smelting of ores, the process which consists in subjecting non-contacting charges of ore and fuel to the heat of an electric arc in a suitable treatment chamber at a sufficient initial temperature to generate reducing gases from the fuel, causing said gases to traverse said chamber and the ore body and react upon the metal constituents of the ore and reduce the same, maintaining the temperature in the region of the ore mass first entered by the gases sufficiently high to fuse the reduced metal, and conducting the reduced molten metal to a point out of contact with both the fuel and the ore body.

6. In the smelting of ores, the process which consists in subjecting non-contacting charges of ore and fuel to the heat of an electric arc in a suitable treatment chamber at a sufficient initial temperature to generate reducing gases from the fuel, causing said gases to traverse asid chamber and ore body and react upon the metal constituents of the ore and reduce the same, maintaining the temperature in the region of the ore mass first entered by the gases sufficiently high to fuse the reduced metal, conducting the reduced molten metal to a bath permanently maintained in the chamber in contact with one of the electrodes and in arcing relation to the opposite electrode, and removing the reduced molten metal and associated slag from the chamber as they accumulate therein with the exception of the portion forming the permanent bath aforesaid.

7. In the smelting of ores, the process which consists in subjecting non-contacting charges of ore and fuel to the heat of the electric arc in a smelting zone with which the charges communicate, at a temperature sufficient to generate reducing gases from the fuel, causing the gases to pass through the smelting zone and traverse the ore mass to reduce the metal constituents thereof, maintaining the temperature in the region of the ore mass first entered by the gases sufficiently high to fuse the reduced metal, conducting the reduced molten metal to the smelting zone into contact with one of the electrodes and in arcing relation with the opposite electrode, maintaining an excess of fuel during the smelting of the ore, and at the same time regulating the temperature in the smelting zone by the heat radiated from the arc, once the proper working conditions in said zone have been attained, and removing the molten products from the smelting zone as they accumulate therein.

8. In the smelting of ores, the process which consists in subjecting to the action of the heat radiated from an electric arc a charge of ore and a substance producing a reducing reagent, the charges of ore and substance being at a sufficient distance from one another to prevent commingling, conducting said reagent to the ore mass, removing the reduced metal resulting from the reaction from the ore mass, and maintaining the same during such removal out of contact with the reducing reagent producer.

9. In the smelting of ores, the process which consists in subjecting to the action of the heat of an electric arc a charge of ore and a substance out of contact therewith producing a gaseous reducing reagent, causing said reagent while hot to react with the body of the ore mass to effect reduction of the metal constituents thereof, conducting the reduced metal to the region of the arc to maintain the same in a molten condition and removing the reduced molten metal.

10. In the smelting of ores, the process which consists in subjecting to the heating action of an electric arc in a suitable treatment chamber a charge of ore and a substance out of contact therewith producing a gaseous reducing reagent, causing the reagent to pass across the chamber and react upon the ore mass to effect reduction of the ore and cause a fusion of the reduced metal, bringing said reduced metal into the path of the current forming the arc to maintain the metal in a fluid condition, and finally removing said reduced molten metal.

11. In the smelting of ores, the process which consists in subjecting a charge of ore to the action of the heat of an electric arc in a treatment chamber, generating reducing gases at a point spaced from the arc and from the ore body, causing said gases to flow across the chamber and into the ore mass to react with the oxidized ore particles, causing the resulting reduced molten metal to flow from the ore body into the chamber in contact with one of the electrodes and into arcing relation with the opposite electrode, and finally removing said reduced molten metal.

12. In the smelting of ores, the process which consists in subjecting to the action of the heat of a suitable resistor, a charge of ore and a substance out of contact therewith producing a gaseous reducing reagent, conducting said reagent to the ore mass, maintaining the temperature during reaction sufficiently high to effect reduction of the metal constituents and cause a fusion of the reduced metal and its discharge from the ore mass in a molten condition, and finally removing the reduced molten metal.

13. In the smelting of ores, the process which consists in subjecting to the action of heat generated by the electric current traversing a resisting medium, a charge of ore and a substance out of contact therewith producing a gaseous reducing reagent, conducting said reagent to the ore mass in sufficient quantities and at sufficient temperature to effect reduction of the metal constituents of the ore, and cause fusion of the reduced metal, and removing the reduced metal while in a fluid state.

14. In an electric furnace, a smelting zone provided with a collecting basin, an electrode leading through the roof of the basin to a point removed a suitable distance from the bottom of the basin, an electrode operating through the basin bottom and conducting the current to a metal bath in the basin in arcing relation to the first electrode, one or more shafts leading from the smelting zone and communicating therewith through bottom discharge openings, and suitable formations between the basin and the discharge openings aforesaid affording support to the discharged portions of the material and permitting the material to dispose itself thereon according to its angle of repose, whereby the material is prevented from sliding into the basin.

15. In an electric furnace, a smelting zone provided with a collecting basin, one or more shafts leading from the smelting zone and communicating therewith through bottom discharge openings, and suitable formations leading from said openings to the basin and raised above the bottom of the basin, affording support to the discharged portions of the material and permitting the material to dispose itself thereon according to its angle of repose, whereby the material is prevented from sliding into the basin.

16. The process of smelting ores which consists in subjecting a charge of ore to the action of reducing gases, generated from a substance out of contact with the ore, maintaining the temperature of the gases remote from their source sufficiently high to cause said gases to react on the ore charge to effect a reduction of the metal constituents thereof, and maintaining the temperature of the ore mass at the points first engaged by the gases sufficiently high to fuse the reduced metal.

17. The process of smelting ores which consists in subjecting a charge of ore to the action of reducing gases, generated from a substance out of contact with the ore, maintaining the temperature of the gases remote from their source sufficiently high to cause said gases to react on the ore charge and effect a reduction of the metal constituents thereof, maintaining within the reducing zone a sufficient reducing atmosphere to prevent reoxidation of the reduced metal by the waste gases, and maintaining the temperature of the ore mass at the points first engaged by the gases sufficiently high to fuse the reduced metal.

18. In smelting ores, the process which consists in subjecting a charge of ore to heat in the presence of a reducing agent to effect a reduction of the metal constituents of the ore, maintaining within the reducing zone an excess of reducing agent over the waste gases to prevent reoxidation of the reduced metal, and maintaining the temperature of the ore mass at the points first engaged by the reducing agent sufficiently high to fuse the reduced metal.

19. In an electric furnace, a smelting zone provided with a collecting basin, one or more shafts communicating with the smelting zone and disposed with relation thereto in a manner to prevent the discharge of solid material into the basin, and a resistor disposed within the smelting zone of the furnace.

In testimony whereof I affix my signature, in presence of two witnesses.

JAMES C. DOW.

Witnesses:
M. R. BYERS,
C. T. BOOKER.